United States Patent [19]

Meyer

[11] Patent Number: 4,504,352
[45] Date of Patent: Mar. 12, 1985

[54] HEAT SEALING APPARATUS

[75] Inventor: Howard E. Meyer, Slippery Rock, Pa.

[73] Assignee: Heat Exchange and Transfer, Inc., Carnegie, Pa.

[21] Appl. No.: 510,279

[22] Filed: Jul. 1, 1983

[51] Int. Cl.³ .......................... B32B 31/26; B44C 7/08
[52] U.S. Cl. ..................................... 156/499; 156/544; 156/574; 156/579
[58] Field of Search ...................... 156/574, 579, 583.1, 156/152, 157, 320, 499, 544

[56] References Cited

U.S. PATENT DOCUMENTS

| | | | | |
|---|---|---|---|---|
| 4,087,309 | 5/1978 | Lang | ..................................... | 156/579 |
| 4,204,904 | 5/1980 | Tabor | ..................................... | 156/574 |
| 4,239,581 | 12/1980 | Lang | ..................................... | 156/579 |

Primary Examiner—Michael Wityshyn
Attorney, Agent, or Firm—Carothers & Carothers

[57] ABSTRACT

A heat sealing or heat welding apparatus for sealing lapped joints in laid up roof structures having an interchangeable drive for driving either or both of a pair of laterally spaced drive wheels and in which a heating element is selectively movable to plural operative positions including positions in alignment with the drive wheels whereby drive wheels perform the dual function of a traction drive and a pressure roll, and the drive wheels are able to traverse a path of travel coincident with that of the heating element during heat sealing of such lapped joints by the apparatus. The interchangeable drive and multiple operative positions of the heating element permit the apparatus to move forwardly for traverse of the lapped joint in either of the opposite directions of travel therealong.

8 Claims, 5 Drawing Figures

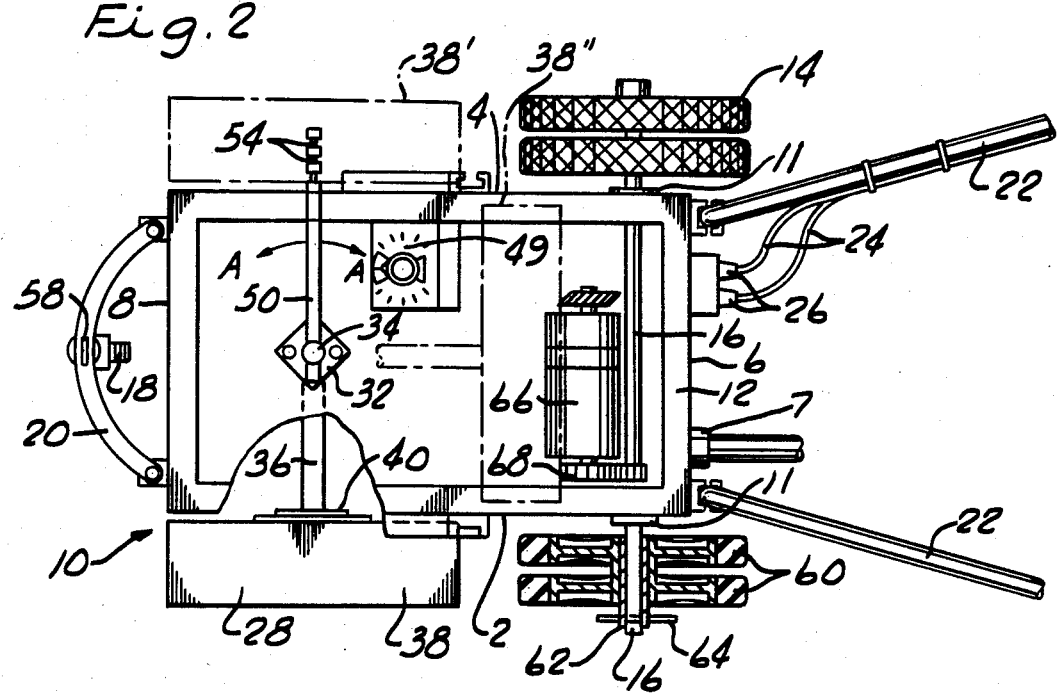
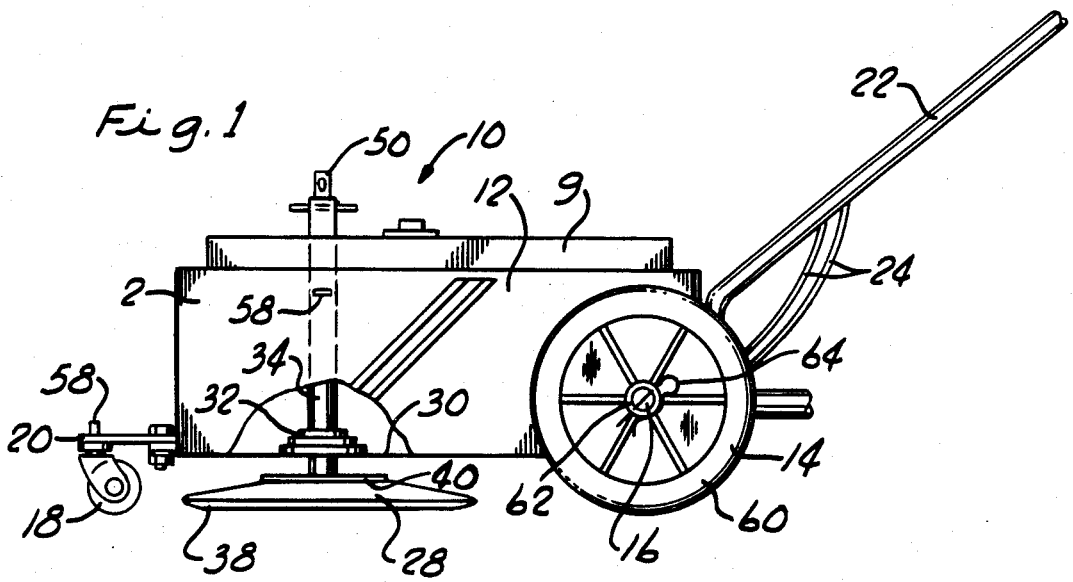

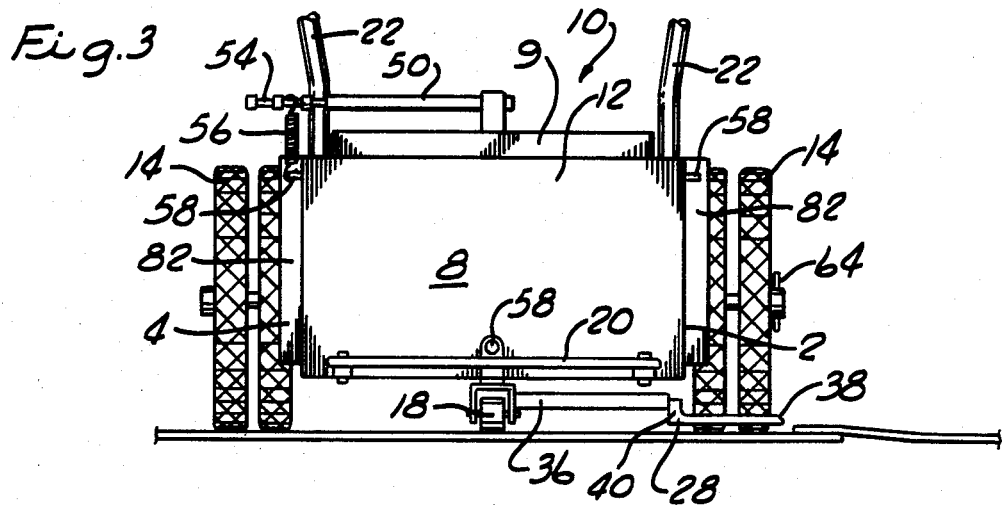
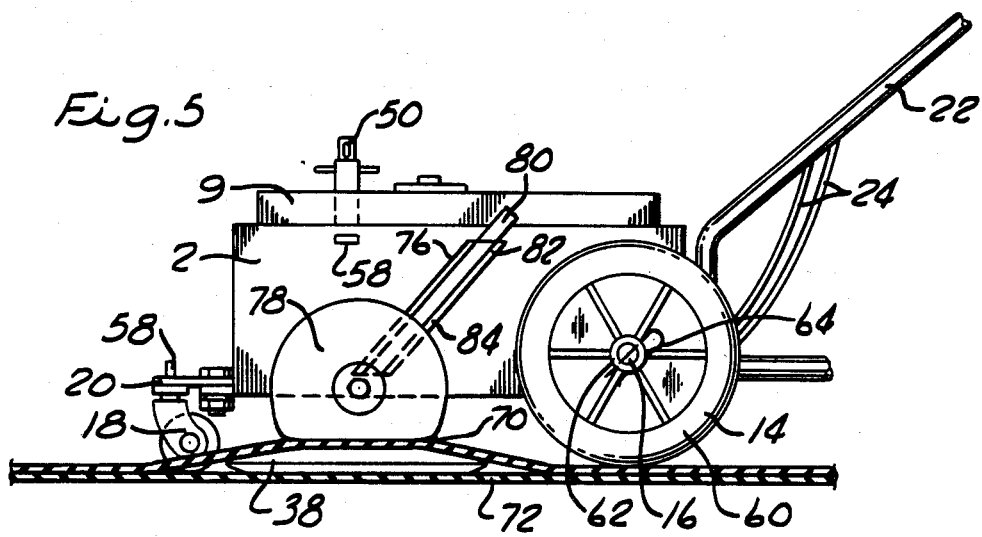
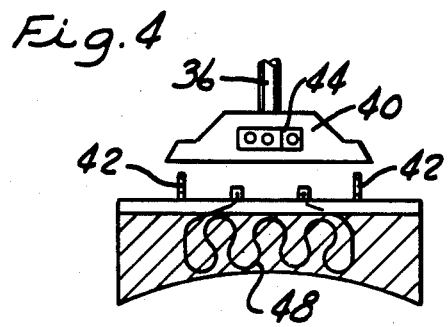

HEAT SEALING APPARATUS

In the art of heat sealing or welding of thermoplastic materials such as applied in the installation of laid-up roofing, it is well known to provide apparatus for heating the facing portions of lapped seams or joints in sheet or strip-like roofing material (e.g., KMM ® Brand membrane roofing systems) to soften a thermoplastic component of the roofing material. The facing portions of the lapped joint are then combined under pressure while the thermoplastic component cools and sets to create a sealed lap joint.

The prior art of creating a continuous sealed interface along such a lapped seam has included such apparatus as manual blowtorches and the method of use has required manually inserting the torch into the lap joint between the adjacent roofing material sheets and moving the torch along the joint, following close behind with a trowel or other suitable implement to work the hot lap joint smooth and thus create the desired seal. This prior art approach has been subject to significant disadvantages and limitations including low productivity, non-uniform joint production, charring or burning of the roofing material, and worker fatigue.

Other prior art discloses portable heat sealing or welding apparatus which directs a hot air stream or a torch flame into the lapped joint as the apparatus is moved along the joint by an operator. Pressure rolls often have been provided in such apparatus to press the heated facing portions of the lap joint together to create the sealed joint. Such prior apparatus has often been provided with wheels for ease of movement thereof by an operator along a seam.

Although generally considered an improvement over the prior manual blowtorch and trowel approach, these prior art portable heat sealing devices have not been without significant shortcomings. For example, the problems of non-uniform heating and of material charring or burning are not generally alleviated by such devices. Such devices, especially the hot air blast type, may trap air bubbles under the roofing material. In addition, the warmup time for the portable hot air apparatus has been excessive, often ranging up to or in excess of 15 minutes. Still further, with the prior hot air and torch flame type apparatus, it has been quite difficult to control the temperature to which the thermoplastic component of the roofing material is elevated, depending upon ambient temperature and upon the rate of travel of the heat source along the lapped seam.

Also prior art heat sealing apparatus are generally constructed such that they are extremely heavy and are top heavy or have a high center of gravity. This shortcoming not only makes them difficult to physically handle, but further makes them hazardous in use due to their tendency to tip over.

Yet another shortcoming of prior portable heat sealing apparatus resides in its limitation to operating while moving in only one of the opposite directions along a seam. Such roofing material as that requiring the heat sealing of lapped joints typically is installed in elongated, relatively narrow strips of, for example, 36 to 48 inches wide. The strips typically are installed in side-by-side parallel fashion working in one direction along an expanse of roof to be covered with each succeeding strip overlapping the prior strip to form a lap joint therebetween. Accordingly, all of the lap joints normally will face the same direction (i.e., the exposed openings between the overlap strips and the underlap strips typically will all face the same direction).

The lap joints may be considered as either left-facing or right-facing joints, with left and right referring to the direction in which the free edge of the overlap strip faces. Accordingly, the left and right lap joint designations are entirely arbitrary and depend only upon the direction in which one is looking along a given joint or seam. Thus, it will be appreciated that prior portable heat sealing apparatus has incorporated a lap joint heating means and pressure means such as rollers on only one side thereof.

Prior machines have been capable of heat sealing lap joints while moving forwardly only in one of the opposite directions of movement along the seam. Thus, in terms of left-facing or right-facing joints, but not both prior portable heat sealing apparatus adapted to seal left-facing lap joints while moving in a forward direction could not also seal right-facing lap joints while moving in a forward direction, but instead had to be pulled backward along the lap joint. The problems of awkward operation, operator fatigue, and safety hazards are inherent in such modes of operation. In addition, the desirable use of following pressure rolls running along the joint behind the heat application location is severely complicated in such devices since the relative positions of the heat application location and the pressure roller is effectively reversed when the machine's direction of travel is reversed from forward travel to reverse or rearward travel. Other shortcomings of the prior art are undue excesses in manpower requirements and the hazards of using highly flammable fuels for a heat source. Still furthermore, the resultant need to back track the apparatus from the end of a completed joint to the opposite end or beginning of the next joint to be sealed has adversely affected joint sealing productivity.

The prior art is exemplified by the following U.S. Pat. Nos.: 4,087,309; 3,239,402, 3,210,227; 2,372,737 and 2,367,725. The last-mentioned Patent discloses generally that electric resistance heating elements are also known as heat sources for joining thermoplastic materials.

The present invention contemplates an improved, self-propelled portable lap joint sealing apparatus including an electric power driven apparatus which is reversible for sealing of a lap joint while moving forwardly in either of opposite directions along the lap joint. Thus, in sealing a plurality of lap joints, the apparatus of the present invention may traverse the length of the joint moving forwardly in one direction and then may be turned around to seal the next joint by moving fowardly therealong in the opposite direction of travel.

The present invention additionally contemplates an arrangement in which the driving force on the wheels of the self-propelled apparatus is interchangeable from the left to the right wheels to permit the line of traction force to be maintained in alignment with the path of travel of the heating element traveling within the lapped joint. The main wheels of the apparatus not only support the apparatus for traverse of the joints to be sealed, but in addition function as pressure rolls which are aligned with and follow the hearing element to press the heated lapped joint together to pressure seal the interface.

Other novel aspects of the invention include an interchangeable heating element and a heating element, a leading pressure roll and a traction connection which are all independently interchangeable between the left and right sides of the apparatus to permit the convenient reversal of operating direction, or alternatively, to permit the apparatus to be utilized in its normal mode of forward motion to seal either left-facing or right-facing lapped joints.

It is therefore one primary object of the present invention to provide an improved heat sealing or welding apparatus adapted for use in laid-up roof construction.

Another more specific object of the present invention is to provide an apparatus which is capable of sealing either a left-facing or right-facing lap joint while moving forwardly therealong.

Still another object of the present invention is to provide a self-propelled heat welding apparatus which is able to seal either left-facing or right-facing lap joints while moving forwardly therealong, and in which the traction drive force of the apparatus may be maintained in longitudinal alignment with the joint being sealed.

Another more specific object of the present invention is to provide a self-propelled heat sealing apparatus including a heating element and a traction drive arrangement which are independently interchangeable between opposite sides of the apparatus whereby the apparatus may be utilized for sealing either left-facing or right-facing lap joints while moving therealong in a forwardly direction.

Another object of the present invention is to provide a self-propelled heat sealing apparatus for sealing or welding of thermoplastic materials, such as applied in the installation of laid-up roofing, which is considerably lighter and has a much lower center of gravity than the apparatus of the prior art.

Other objects and advantages appear in the following description and claims.

The accompanying drawings show, for the purpose of exemplification without limiting the invention or the claims thereto, certain practical embodiments illustrating the principles of this invention wherein:

FIG. 1 is a partially broken away side elevation of a heat sealing apparatus according to the present invention.

FIG. 2 is a top plan view, partially sectioned and with components shown in moved positions, of the apparatus of FIG. 1.

FIG. 3 is a front elevation of the apparatus of FIGS. 1 and 2.

FIG. 4 is a detail of a heating element of the apparatus of FIG. 1.

FIG. 5 is an elevation similar to FIG. 1 showing additional features of the present invention.

There is generally indicated at 10 in FIGS. 1 through 3 a heat sealing apparatus according to one presently preferred embodiment of the present invention and shown as comprising a fabricated housing or base 12 including sidewalls 2 and 4, end walls 6 and 8, a floor 30 and a hinged cover member 9.

Housing 12 has mounted thereon adjacent the rearward end thereof drive wheel sets 14 mounted on a solid axle 16 which is rotatable in suitable floating or pillow block bearings 11 carried by sidewalls 2 and 4 to permit wheel sets 14 to ride over rough roof contours. A castering idler or support wheel assembly 18 is secured to a bracket 20 which is mounted adjacent the lower forward end of housing 12. An elongated handle assembly 22 is preferably releasably secured adjacent the rearward end of housing 12 and projects rearwardly and upwardly therefrom to provide guide and control means for use by an operator. Control of the electrical functions of the apparatus 10 is provided by controls mounted at the rearwardmost end (not shown) of handle assembly 22 for the of convenience of the operator. To facilitate easy removal and attachment of handle assembly 22 to base 12, the electrical controls (not shown) such as a heat level control and a motor control are mounted on handle assembly 22 and are provided with electrical leads 24 and plug-in connection 26 to housing 12 adjacent rear wall 6. A releasable main power source connection 7 is also provided in end wall 6 for connection thereto of power source leads such as a run of electrical cable.

A heating element assembly 28 is mounted adjacent a forward end of apparatus 10 in floor 30 of housing 12 by means of a suitable floating bearing assembly 32 such as a rotary pillow block bearing assembly. Heating element assembly 28 includes a generally vertically extending upright 34 which passes through and is carried by bearing assembly 32, a cantilever arm 36 which is secured to upright 34 beneath floor 30 so as to project laterally outward from upright 34, and an electric resistance heating element plate 38 which is removably affixed adjacent the outer end of cantilever arm 36.

As shown in FIG. 4, heating element plate 38 is removably secured to mounting bracket 40 as by means of bolts 42 for example, and bracket 40 is in turn suitably secured to the outer end of cantilever arm 36. Bracket 40 includes temperature control means such as a thermostat 44 which is located in close proximity to the heat application location in the lapped seam to be sealed, and is therefore able to exert a control over the temperature of the seam by selectively interrupting electrical current flow to heating element plate 38. Also as shown in FIG. 4, heating element 38 includes plug-in resistance element connections 42 which connect to receptacles in bracket 40 and which are connected to opposite ends of an elongated resistance element 48. Temperature of element plate 38 is also controlled to desired levels by thermocouple or temperature control 49 through a range of 100°–1100° F., continuous duty.

Element 48 is arranged preferably in serpentine fashion and embedded within heating element plate 38 to uniformly heat the plate 38 upon the imposition of an electrical current flow therethrough. The preheat time for the heating element plate 38 is on the order of one minute. Heating element plate 38 preferably is a metal casting of silicone bronze for example, having the resistance element 48 cast integrally therein. Other castable metals capable of providing for quick and uniform heating, easy cleaning and other desirable properties of a resistance heating element for use in heat welding of thermoplastic materials could be employed as alternatives, however, an aluminum element, for example, could not operate over as broad a temperature range. FIG. 4 also illustrates one of many contemplated variations in the form of plate 38, that shown being of concave form for use in working around pipes and vents for example. Plates 38 of other forms may be interchangeably connected to bracket 40.

The outer contours of plate 38 are tapered or sloped in two directions as shown to prevent it from snagging as it is being drawn between roofing overlaps and to wedge the overlap roofing portion up.

Upright 34 projects vertically upward from the inner end of cantilever arm 34 through bearing 32 and within the interior of housing 12. A removable handle 50 engages the upper end of upright 34 through an opening formed in cover member 9 and projects laterally outward therefrom. By rotation of handle 50 as indicated by arrows A in FIG. 2, heating element plate 38 may be moved from the left side operative position as shown in solid line in FIG. 2 to a right side operative position 38' or a stowed position 38" beneath the floor 30 of housing 12 as shown in phantom line in FIG. 2. To retain heating element plate 38 in any of these positions, the outer end of handle 50 is provided with circumferential grooves 54 which may be engaged by a tension spring 56 (FIG. 3). The opposite end of which is retained by one of several spring retention lugs 58 affixed to base 12 in positions corresponding to the positions of handle 50 for heating element positions 38, 38' and 38".

Electrical connections for heating element 28 are routed from bracket 40 through hollow interior portions of cantilever arm 36 and upright 34 into the interior of housing 12, the electrical connections therein with outside power sources being well known and therefore now shown in the drawings.

The drive wheel sets 14 each preferably include a pair of rubber tired wheels 60 which are mounted for rotation in common with an elongated bearing sleeve 62 that is received upon line axle 16. Any suitable retention means such as a snap ring (not shown) retains the wheel sets 14 on axle 16. To provide selective driving engagement between either or both of wheel sets 14 and axle 16, a hitch pin 64 is passed through aligned radial through bores in the outer ends of axle 16 and the corresponding outer ends of sleeves 62. Accordingly, either or both of wheel sets 14 may be selectively engaged with axle 16 for providing traction force to propel apparatus 10 along a roof seam.

To provide the necessary traction force, an electric traction motor 66 is mounted within housing 12 in driving engagement with axle 16 as through a suitable gear train 68. Preferably, a mechanical clutch (not shown) of any suitable design is provided with controls therefore accessible at the upper ends of handles 22 by an operator to selectively engage and disengage motor 66 from driving engagement with axle 16.

It will be seen from FIGS. 2 and 5 that in operation, the heating element plate 38 may be positioned to either side of base 12 for operating in either direction of travel along a lapped seam, or in alternative terms, for sealing either left-facing or right-facing lap joints. In practice, the hitch pin 64 is utilized to provide driving engagement for the drive wheel set 14 on the same side of apparatus 10 as that on which heating element plate 38 is positioned, whereby the line of action of the traction drive force is aligned along the joint with the line of action of the resistance force associated with movement of the heating element 38 along the seam.

As shown in FIG. 5, the heating element plate 38 (power requirements approximately 4000 watts for preheating and approximately 1500 watts for operation) is inserted between the overlap and underlap portions 70 and 72 of a lapped joint. That is, the underlap portion 72 passes under heating element 38 and the overlap portion 70 passes thereover. Both the overlap and underlap portions 70 and 72 of the joint have the mating surfaces thereof passing in heat transfer relationship with respect to heating element plate 38, and the heat therefrom thus softens the thermoplastic component in the facing overlap and underlap joint portions 70 and 72. As the apparatus 10 proceeds, heating element 38 progressively heats and softens the overlap and underlap joint portions 70 and 72 which then pass rearwardly of heating element 38 and are brought together under the drive wheel set 14 of the same side of the apparatus 10. The joint is thus heat welded under pressure to provide a suitable seal. The double wheel arrangement of wheel sets 14 ensures contact across the full width of the lapped joint and also tends to stretch the overlap joint portion into good contact with plate 38 and subsequent smooth sealing contact with the underlap joint portion.

Plate 38 is thus more or less free floating within confined limits and acts as a wabble plate to follow uneven contours. Also the weight of the overlap portion and the traction of the driven wheel set 14 pushes plate 38 down, as a sort of counter weight, into continuous engagement with the roofing underlap portion.

To ensure that the overlap portion 70 is maintained in proximity to heating element 38 and free of buckling or other undesirable surface deformations, a guide roll assembly 76 may be provided. Guide roll 76 includes a roller 78, preferably an inflatable roller or tube, rotatably affixed to an elongated carrier arm 80 which is inserted in and freely slidably in an elongated guide track 82 which is mounted diagonally upon the adjacent side wall of housing 12. A guide track 82 may be mounted on each side wall 2 and 4 of housing 12, of course. Guide track 82 comprises an open front channel member 84 which non-rotatably retains arm 80 therein and permits the arm 80 and attached roller 78 to be slidably inserted thereinto and removed therefrom longitudinally from the upper, open end of channel member 84. When in place, roller 78 rides under the weight of assembly 76 along the top surface of the overlap portion 70 of a joint to maintain contact thereof with heating element plate 38. As the heat sealing operation proceeds, the floating mount of heating element 28 permits heating element plate 38 to follow irregularities in the roof surface and thereby assure a better quality lap joint seal. The inflatable roller or tube is partially filled with liquid and is only partially inflated so that it engages the upper surface of the overlap joint with sufficient weight over a wide flat or flattened contact area. In hot weather conditions, the weighted roller may not have to be employed as the roofing material may be sufficienlty plastic to uniformly engage plate 38 with continuous smooth contact.

According to the description hereinabove, there is provided by the present invention an improved heat sealing apparatus for producing heat sealed lap joints in a laid-up roof structure wherein the lap joints may be processed as either left-facing or right-facing joints by the same machine operating in its normal forwardly directed mode of operation. The apparatus provides for a heating element which is selectively movable from one side of the apparatus to the other, and includes the capability of selecting either left side or right side traction drive. In addition, the heating element in either operative position thereof is aligned with one of the two sets of selectively engageable drive wheels such that the line of action of frictional resistance along the lap joint may be aligned with the line of action of the traction drive force, thus minimizing the turning moment on the apparatus with resultant improved ease of operator control.

Notwithstanding the description hereinabove of one presently preferred embodiment of the invention, it is to be appreciated that the invention may be practiced in numerous alternative embodiments with various modifications thereto without departing from the broad spirit and scope thereof. Accordingly, it is intended that the invention be construed broadly and limited only by the scope of the claims appended hereto.

I claim:

1. In a portable heat sealing apparatus adapted to be moved forwardly to traverse an elongated lapped joint between adjacent expanses of roofing material in a laid up roof structure to progressively form a continuous longitudinally extending seal between respective adjacent thermoplastic overlap and underlap portions of such a lapped joint, the combination comprising:
   a base assembly;
   support wheel means for supporting a said base assembly with respect to such a roof structure;
   a heating element means adapted to be inserted between such thermoplastic overlap and underlap portions for heating thereof coincident with the forward moving traverse of such a lapped joint by said apparatus to permit the forming of such a longitudinally extending seal;
   said heating element means being selectively movable to at least a pair of operative positions to permit said heat seal apparatus to form such a longitudinally extending seal during the forward moving traverse of such a lapped joint in either of opposite directions of travel therealong; and
   said support wheel means including a pair of pressure roll means continuously maintained in alignment with said pair of operative positions in following relationship thereto during such forward moving traverse of such a lapped joint to provide positive joining of such overlap and underlap portions under pressure subsequent to heating thereof by said heating element means in either of said operative position.

2. The combination as claimed in claim 1 additionally including traction drive means cooperable with said support wheel means for propelling said apparatus in such forward traverse of such a lapped joint.

3. The combination as claimed in claim 2 wherein said traction drive means is selectively cooperable with either of said pair of pressure roll means to provide therethrough traction driving force for propelling said apparatus in such traverse of such a lapped joint.

4. The combination as claimed in claim 3 wherein said pair of pressure roll means is aligned, respectively, with said pair of operative positions in a manner that the traction driving forces provided therethrough are directed on a line of action coincident with the path of travel of the respective said operative positions along such a lapped joint during forward traverse thereof by said apparatus.

5. The combination as claimd in claim 4 additionally including floating support means for flexibly supporting said heating element means with respect to said support wheel means in either of said operative positions.

6. The combination as claimed in claim 5 wherein said heating element means is an electric resistance heating element.

7. The combination as claimed in claim 6 wherein said traction drive means includes an electric traction drive motor.

8. A portable heat sealing apparatus adapted to be moved forwardly to traverse an elongated lapped joint between adjacent expanses of roofing material in a laid up roof structure to progressively form a continuous longitudinally extending seal between respective adjacent thermoplastic overlap and underlap portions of such a lapped joint comprising:
   a base;
   support wheel means for supporting said base with respect to such a roof structure;
   said support wheel means including at least a pair of wheels located at laterally spaced locations with respect to said base;
   powered traction means for providing traction force to drive said wheels;
   selectively engageable power transfer means for selectively engaging and disengaging each of said wheels with said power traction means to selectively provide traction force thereto;
   heating element means adapted to be inserted between said thermoplastic overlap and underlap portions of such a lapped joint for heating thereof; and
   adjustable support means for supporting said heating element means with respect to said base in either of a pair of operative positions, each of which is coincident with the path of travel of a respective one of said wheels during such forward moving traverse of such a lapped joint whereby said apparatus is able to form such a longitudinally extending seal by progressive heating of such thermoplastic overlap and underlap portions by said heating element means followed by a progressive positive mutual engagement of said overlap and underlap portions under pressure exerted by one of said wheels which is being driven by said powered traction means during forward moving traverse of such an elongated lapped joint in either of opposite directions of travel therealong.

* * * * *